United States Patent [19]
Ichinose et al.

[11] Patent Number: 5,381,696
[45] Date of Patent: Jan. 17, 1995

[54] SEMICONDUCTOR STRESS SENSOR

[75] Inventors: Katsuki Ichinose, Saitama; Katuhiko Takebe, Tokyo, both of Japan

[73] Assignee: Honda Giken Kogyo Kabushiki Kaisha, Tokyo, Japan

[21] Appl. No.: 883,752

[22] Filed: May 15, 1992

[30] Foreign Application Priority Data

May 17, 1991 [JP] Japan .................. 3-142360

[51] Int. Cl.$^6$ .................. G01B 7/16
[52] U.S. Cl. .................. 73/771
[58] Field of Search .......... 73/765, 769, 771, 777, 73/862.622, 862.625, 862.68, 517 R, 754, 723; 257/415, 417–420; 307/278, 308

[56] References Cited

U.S. PATENT DOCUMENTS

| | | | |
|---|---|---|---|
| 3,130,578 | 4/1964 | Ames, Jr. | 73/777 |
| 3,582,690 | 6/1971 | Yerman | 73/765 |
| 3,624,315 | 11/1971 | Broce . | |
| 3,740,689 | 6/1973 | Yamashita . | |
| 4,191,057 | 3/1980 | Busta | 73/777 |
| 4,522,072 | 6/1985 | Sulouff et al. . | |
| 4,658,279 | 4/1987 | Guckel . | |
| 4,706,100 | 11/1987 | Tufte . | |
| 4,706,374 | 11/1987 | Murakami . | |
| 4,791,471 | 12/1988 | Onodera et al. . | |

FOREIGN PATENT DOCUMENTS

| | | |
|---|---|---|
| 0040795 | 5/1981 | European Pat. Off. . |
| 0178662 | 10/1985 | European Pat. Off. . |
| 0363005 | 4/1990 | European Pat. Off. . |
| 1336813 | 7/1963 | France . |
| 57-17830 | 1/1982 | Japan . |
| 57-148377 | 9/1982 | Japan . |
| 59-158566 | 9/1984 | Japan . |
| 61-153537 | 7/1986 | Japan . |
| 2194343 | 7/1990 | Japan . |
| 2130373 | 7/1983 | United Kingdom . |
| 2175744A | 12/1986 | United Kingdom . |

OTHER PUBLICATIONS

Piezoelectric Field–Effect Transistor Strain Transducers, Authors: James Conragan and Richard S. Muller, pp. 52–55.

*Primary Examiner*—Robert Raevis
*Attorney, Agent, or Firm*—Lyon & Lyon

[57] ABSTRACT

A semiconductor stress sensor includes a field-effect transistor for producing a drain current commensurate with a stress applied thereto. The gate of the field-effect transistor is supplied with a gate bias voltage from a gate bias voltage generator. The drain current from the field-effect transistor is converted into a detected output signal by a current-to-voltage converter. The gate-to-source voltage of the field-effect transistor can be varied to reduce the drain current in a standby mode when no stress is to be detected. To vary the gate-to-source voltage, the gate bias voltage applied to the gate of the field-effect transistor may be slightly varied or the source potential thereof may be slightly varied. The gate-to-source voltage of the field-effect transistor slightly differ from each other in the standby and stress sensing modes. Even in the standby mode, the field-effect transistor is supplied with substantially the same voltage as in the stress sensing mode. When the semiconductor stress sensor switches from the standby mode to the stress sensing mode, the drain current is subjected to an only small drift, allowing the semiconductor stress sensor to produce a highly accurate, stable detected output signal within a short period of time.

7 Claims, 3 Drawing Sheets

SEMICONDUCTOR STRESS SENSOR

BACKGROUND OF THE INVENTION

1. Field of the Invention

The present invention relates to a semiconductor stress sensor comprising a field-effect transistor formed on a semiconductor substrate of GaAs (gallium arsenide) or the like, for detecting a stress applied to the field-effect transistor.

2. Description of the Relevant Art

It is known in the art from Japanese laid-open patent publication No. 61-153537, for example, that when a stress is applied to a field-effect transistor made of a piezoelectric semiconductor such as GaAs, the drain current of the field-effect transistor varies. There have been used semiconductor stress sensors for detecting external forces such as pressure, accelerations based on the above nature of a field-effect transistor.

FIG. 5 of the accompanying drawings shows the circuit arrangement of a conventional semiconductor stress sensor.

The conventional semiconductor stress sensor, generally designated by the reference numeral 101 in FIG. 5, comprises a field-effect transistor 102 made of a piezoelectric semiconductor such as GaAs or the like, a current-to-voltage (I-V) converter 103 for producing a voltage output corresponding to a drain current ID from the field-effect transistor 2, and a gate bias voltage generator 104 composed of two series-connected resistors R1, R2 for producing a gate bias voltage to be applied to the field-effect transistor 2.

The field-effect transistor 102 has a drain D connected to a power supply VDD and a gate G connected to the junction between the resistors R1, R2. Therefore, the voltage divided by the resistors R1, R2 is applied as a gate bias voltage VG to the gate G of the field-effect transistor 102.

The current-to-voltage converter 103 comprises an operational amplifier 103a and a feedback resistor 103b. The operational amplifier 103a has an inverting input terminal 103c connected to the source S of the field-effect transistor 2, and a non-inverting input terminal 103d connected to ground. The feedback resistor 103b is connected between the output terminal of the operational amplifier 103a and the inverting input terminal 103c. The potential difference between the input terminals 103c, 103d of the operational amplifier 103a is substantially zero, so that the potential at the inverting input terminal 103, i.e., the source potential of the field-effect transistor 102, is substantially at the ground level. Therefore, the field-effect transistor 102 is driven with a constant voltage.

When no stresses are detected by the semiconductor stress sensor 101, i.e., when the semiconductor stress sensor 101 is in a standby mode, the voltage from the power supply VDD is cut off, or the power supply VDD is switched off, to cut off the drain current ID of the field-effect transistor 102. In the standby mode, therefore, any current which is consumed by the semiconductor stress sensor 101 is reduced.

However, since the drain D, gate G, and source S of the field-effect transistor 102 are de-energized in the standby mode, it will take several seconds to several minutes for the semiconductor stress sensor 101 to be able to produce a stable detected output signal after the power supply voltage starts to be applied for stress detection. For a certain period of time after the power supply voltage starts to be applied, even if a constant stress is applied to the field-effect transistor 101, the detected output signal tends to vary gradually or the drain current ID is liable to increase or decrease for several seconds to several hours. Such a drift should be avoided as much as possible.

To effect highly accurate stress measurements, therefore, the semiconductor stress sensor 101 should be energized for a sufficient period of time before it is required to detect applied stresses. As a result, the standby mode of the semiconductor stress sensor 101 is available only for short periods of time, and hence the power consumption by the semiconductor stress sensor 101 cannot be reduced.

SUMMARY OF THE INVENTION

It is an object of the present invention to provide a semiconductor stress sensor which will consumes a relatively low electric current in a standby mode when no stresses are detected.

Another object of the present invention is to provide a semiconductor stress sensor which can produce a stable and accurate detected output signal within a short period of time after it has started detecting an applied stress, i.e., which can switch from a standby mode to a stable stress sensing mode within a short period of time.

According to the present invention, there is provided a semiconductor stress sensor comprising a field-effect transistor for producing a drain current commensurate with a stress applied thereto, biasing means for applying a gate bias voltage to the field-effect transistor, converting means for converting the drain current from the field-effect transistor into a detected output signal, and switching means for varying a gate-to-source voltage of the field-effect transistor to reduce the drain current in a standby mode when no stress is to be detected.

The biasing means comprises a gate bias voltage generator comprising a plurality of series-connected resistors for applying a divided voltage to as the gate bias voltage to a gate of the field-effect transistor, and the switching means comprises a switch for selectively shunting one of the resistors to ground, whereby the gate-to-source voltage of the field-effect transistor can be varied when said one of the resistors is shunted to ground by the switch.

Alternatively, the converting means comprises an operational amplifier having a first input terminal for receiving the drain current from the field-effect transistor, and a second input terminal, and the switching means comprises a switch having a movable contact connected to the second input terminal, a first fixed terminal connected to ground, and a second fixed terminal connected to a voltage supply, whereby the gate-to-source voltage of the field-effect transistor can be varied when the movable contact is connected to the second fixed terminal.

The gate-to-source voltage of the field-effect transistor slightly differ from each other in the standby and stress sensing modes. Even in the standby mode, the field-effect transistor is supplied with substantially the same voltage as in the stress sensing mode. When the semiconductor stress sensor switches from the standby mode to the stress sensing mode, the drain current is subjected to an only small drift, allowing the semiconductor stress sensor to produce a highly accurate, stable detected output signal within a short period of time.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
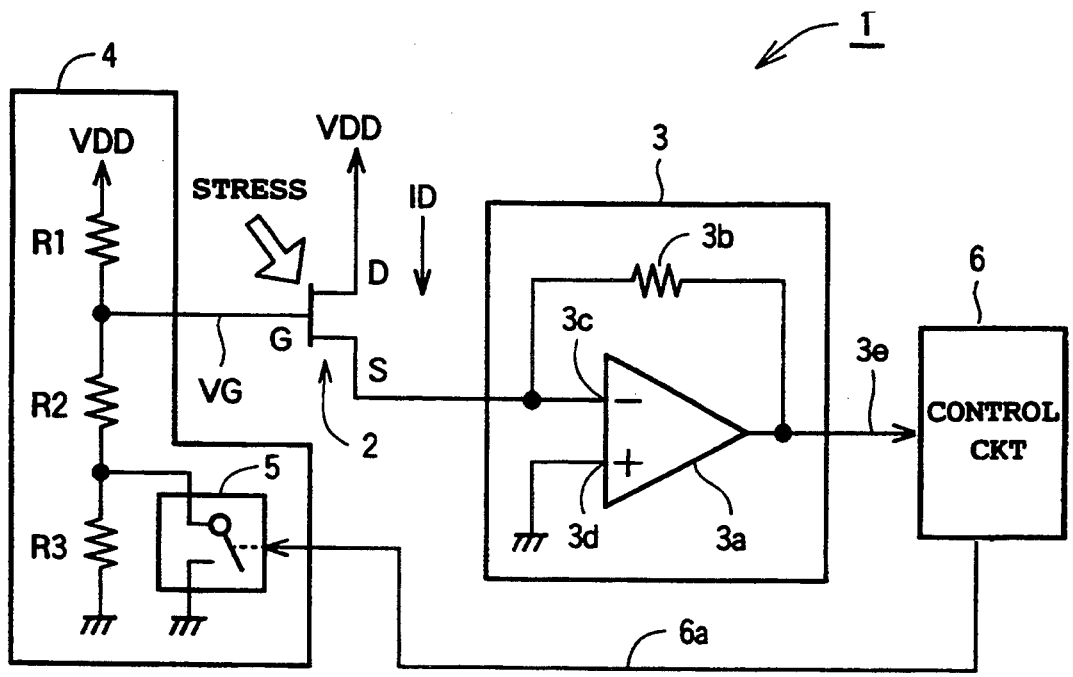
FIG. 1 is a circuit diagram, partly in block form, of a semiconductor stress sensor according to a first embodiment of the present invention.

Like or corresponding parts are denoted by like or corresponding reference numerals throughout views.

FIG. 1 shows a circuit arrangement of a semiconductor stress sensor according to a first embodiment of the present invention.

The semiconductor stress sensor, generally designated by the reference numeral 1 in FIG. 1, comprises a field-effect transistor 2 made of a piezoelectric semiconductor such as GaAs or the like, a current-to-voltage (I-V) converter 3 for producing a voltage output corresponding to a drain current ID from the field-effect transistor 2, a gate bias voltage generator 4 composed of three resistors R1, R2, R3 and a switch 5, for producing a gate bias voltage to be applied to the field-effect transistor 2, and a control circuit 6 for turning on or off the switch 5 to switch between a standby mode and a stress sensing mode of the semiconductor stress sensor 1. When a stress is applied to the field-effect transistor 2, its drain current ID varies depending on the applied stress.

The three resistors R1, R2, R3 of the bias voltage generator 4 are connected in series between a power supply VDD and a ground potential. The switch 5 is connected between the ground potential and the junction between the resistors R2, R3. The junction between the resistors R1, R2 is connected to the gate G of the field-effect transistor 2.

The switch 5 is turned on or off by a mode switching control signal 6a applied by the control circuit 6. Specifically, to enter the standby mode, the switch 5 is turned on to short-circuit or shunt the resistor R3.

The field-effect transistor 2 has a drain D connected to the power supply VDD, and a source S connected to an input terminal of the current-to-voltage converter 3.

Therefore, when the switch 5 is turned on or off by the mode switching control signal 6a from the control circuit 6, a voltage divided by the resistors R1, R2, R3, i.e., a gate bias voltage VG supplied to the gate G of the field-effect transistor 2, is varied to change the drain current ID of the field-effect transistor 2.

Figure 5:
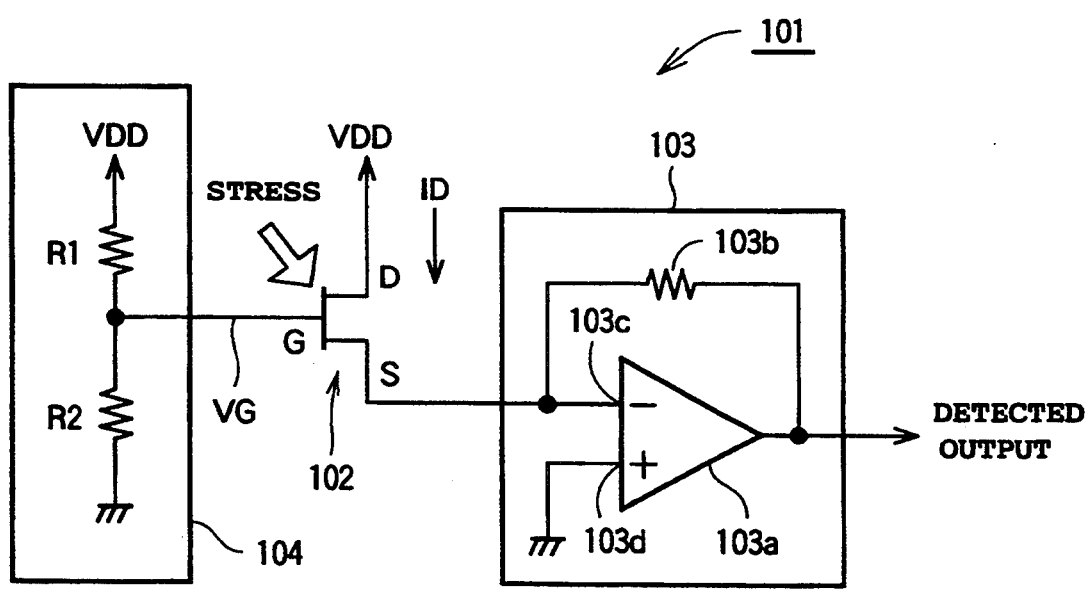
FIG. 5 is a circuit diagram, partly in block form, of a conventional semiconductor stress sensor.

The current-to-voltage converter 3 comprises an operational amplifier 3a and a feedback resistor 3b. The operational amplifier 3a has an inverting input terminal 3c connected to the source S of the field-effect transistor 2, and a non-inverting input terminal 3d connected to ground. The feedback resistor 3b is connected between the output terminal of the operational amplifier 3a and the inverting input terminal 3c. The current-to-voltage converter 3 operates in the same manner as the current-to-voltage converter 103 shown in FIG. 5, for driving the field-effect transistor 2 with a constant voltage.

The control circuit 6 effects various processing operations based on a detected output signal 3e from the current-to-voltage converter 3, and supplies a processed signal to another circuit or controls another circuit based on a processed signal. Only when it is necessary for the semiconductor stress sensor 1 to detect an applied stress, i.e., to operate in the stress sensing mode, the control circuit 6 produces the mode switching control signal 6a to turn off the switch 5.

When the switch 5 is turned off, the bias voltage generator 4 supplies the gate bias voltage VG to make the field-effect transistor 2 active. When the switch 5 is turned on, the bias voltage generator 4 changes the gate bias voltage VG so as to be close to a threshold voltage VTH of the field-effect transistor 2, thus greatly reducing the drain current ID of the field-effect transistor 2. Therefore, the semiconductor stress sensor 1 is in the standby mode when the switch 5 is turned on.

Figure 2:
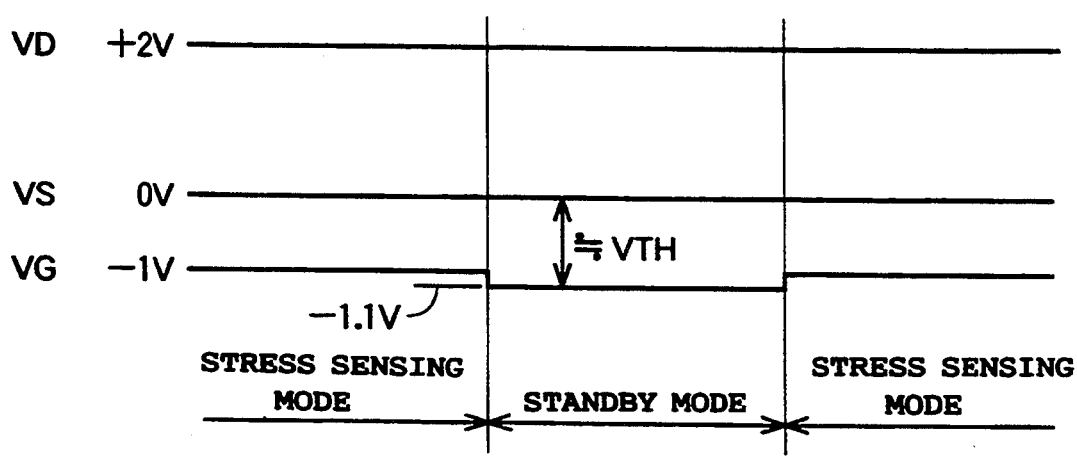
FIG. 2 is a timing chart of voltages supplied to the terminals of a field-effect transistor of the semiconductor stress sensor shown in FIG. 1.

More specifically, as shown in FIG. 2, when the switch 5 is turned on, i.e., when the semiconductor stress sensor 1 is in the standby mode, the gate bias voltage VG is lowered by, e.g., 0.1 V, while the drain and source potentials VD, VS of the field-effect transistor 2 remain unchanged. In this manner, the drain current ID of the field-effect transistor 2 is greatly reduced in the standby mode.

When the semiconductor stress sensor 1 is to switch from the standby mode to the stress sensing mode, it is only necessary to slightly change the gate bias voltage VG of the field-effect transistor 2, i.e., to increase the gate bias voltage VG by 0.1 V. Consequently, after the semiconductor stress sensor 1 enters the stress sensing mode, any drift of the drain current ID is small, and the detected output signal 3e is stabilized quickly. Therefore, the current-to-voltage converter 3 can immediately produce a highly accurate, stable detected output signal 3e in the stress sensing mode.

Figure 3:
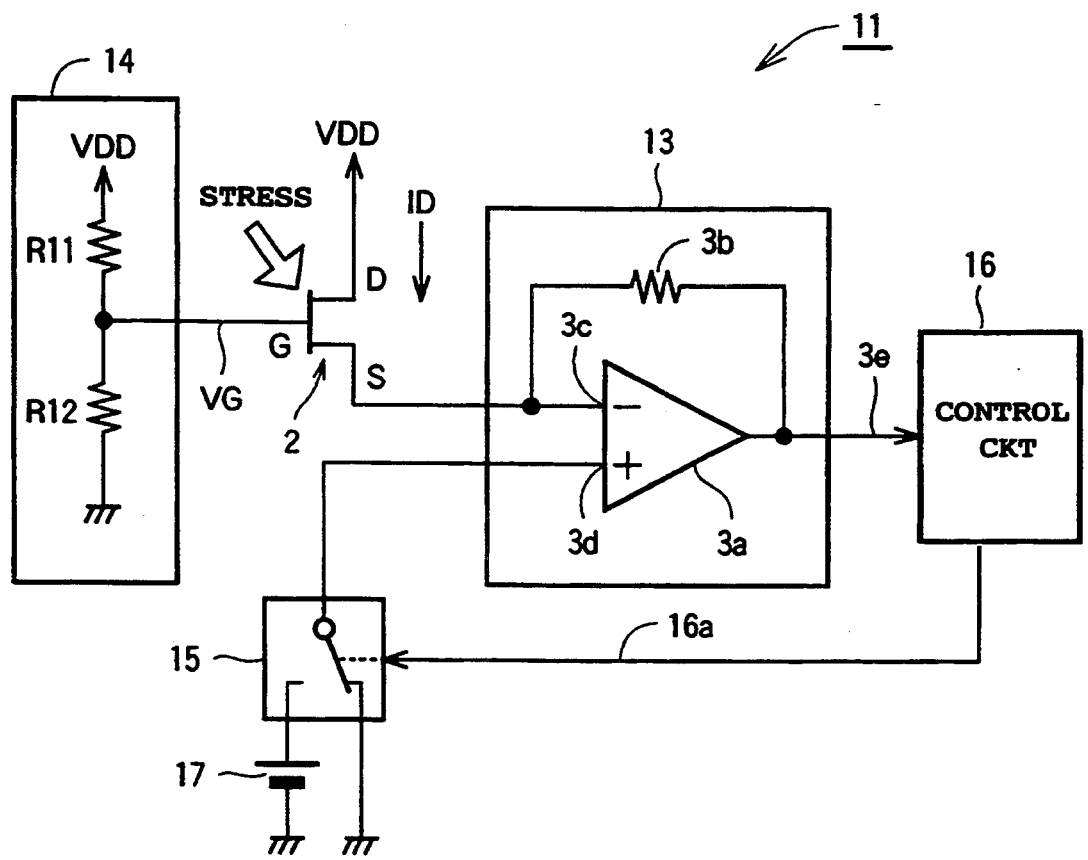
FIG. 3 is a circuit diagram, partly in block form, of a semiconductor stress sensor according to a second embodiment of the present invention.

FIG. 3 shows a semiconductor stress sensor, generally designated by the reference numeral 11, according to a second embodiment of the present invention.

The semiconductor stress sensor 11 comprises a field-effect transistor 2 made of a piezoelectric semiconductor such as GaAs or the like, a current-to-voltage (I-V) converter 13 for producing a voltage output corresponding to a drain current ID from the field-effect transistor 2, a bias voltage generator 14 composed of two series-connected resistors R11, R12 for applying a fixed gate bias voltage VG to the field-effect transistor 2, a switch 15 for switching between a standby mode and a stress sensing mode of the semiconductor stress sensor 11, and a control circuit 16 for turning on or off the switch 15 to select the standby mode or the stress sensing mode.

The field-effect transistor 2 shown in FIG. 3 is identical in structure to the field-effect transistor 2 shown in FIG. 1. The current-to-voltage converter 13 is of a structure identical to that of the current-to-voltage converter 3 shown in FIG. 1.

The junction between the series-connected resistors R11, R12 of the gate bias generator 14 is connected to the gate G of the field-effect transistor 2. Therefore, the gate bias generator 14 applies a fixed gate bias voltage VG to the gate G of the field-effect transistor 2.

The switch 15 has a movable contact connected to the non-inverting input terminal 3d of the operational amplifier 3a, a first fixed terminal connected to ground, and a second fixed terminal connected to a voltage source 17 such as a cell. The switch 15 can selectively apply the potential of the voltage source 17 or the ground potential to the non-inverting input terminal 3d under the control of a mode switching control signal 16a from the control circuit 16.

When the semiconductor stress sensor 11 is to be brought into the standby mode, the control circuit 16 applies the mode switching control signal 16a to the switch 15 to connect the non-inverting input terminal 3d of the operational amplifier 3a to the voltage source 17. The source potential VS of the field-effect transistor 2 is changed to make the gate-to-source voltage close to the threshold voltage VTH of the field-effect transistor 2, thus reducing the drain current ID thereof.

Figure 4:
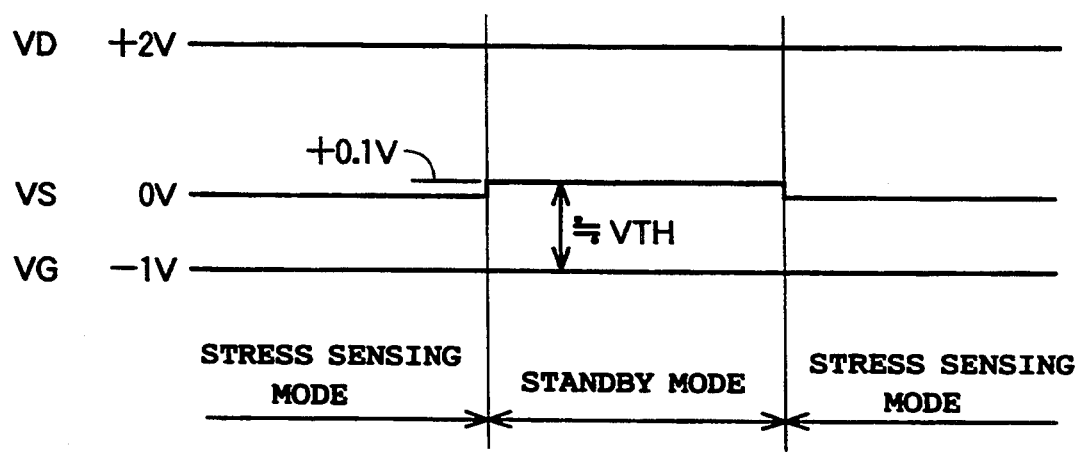
FIG. 4 is a timing chart of voltages supplied to the terminals of a field-effect transistor of the semiconductor stress sensor shown in FIG. 3.

More specifically, as shown in FIG. 4, in the standby mode, the source voltage VS is slightly increased by 0.1 V, for example, to cause the field-effect transistor 2 to operate near its cut-off region, so that the drain current ID is reduced.

When the semiconductor stress sensor 1 is to switch from the standby mode to the stress sensing mode, it is only necessary to slightly change the source potential VS of the field-effect transistor 2, i.e., to increase the source potential VS by 0.1 V. Consequently, after the semiconductor stress sensor 1 enters the stress sensing mode, any drift of drain current ID is small, and the detected output signal 3e is stabilized quickly. Therefore, the current-to-voltage converter 13 can immediately produce a highly accurate, stable detected output signal 3e in the stress sensing mode.

In the semiconductor stress sensors according to the present invention, the gate-to-source voltage of the field-effect transistor differ from each other in the standby mode and the stress sensing mode. In the standby mode, the drain current of the field-effect transistor is reduced to suppress any current consumption.

The gate-to-source voltage of the field-effect transistor slightly differ from each other in the standby mode and the stress sensing mode. Even in the standby mode, the field-effect transistor is supplied with substantially the same voltage as in the stress sensing mode. Consequently, when the semiconductor stress sensor switches from the standby mode to the stress sensing mode, the drain current is subjected to an only small drift, allowing the semiconductor stress sensor to produce a highly accurate, stable detected output signal within a short period of time.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A semiconductor stress sensor comprising:

a field-effect transistor for producing a drain output commensurate with a stress applied thereto, biasing means for applying a gate bias voltage to said field-effect transistor, said biasing means comprising a gate bias voltage generator comprising a plurality of series-connected resistors for applying a divided voltage to a gate of said field-effect transistor, converting means for converting the drain output from said field-effect transistor into a detected output signal, and control means for varying a gate-to-source voltage of said field-effect transistor to reduce said drain output in a standby mode when no stress is to be detected, said control means comprising a switch for selectively shunting one of said resistors to ground, whereby said gate-to-source voltage of said field-effect transistor can be varied when said one of the resistors is shunted to ground by said switch.

2. A semiconductor stress sensor comprising:

a field-effect transistor for producing a drain output commensurate with a stress applied thereto, biasing means for applying a gate bias voltage to said field-effect transistor, converting means for converting the drain output from said field-effect transistor into a detected output signal, and control means for varying a gate-to-source voltage of said field-effect transistor to reduce said drain output in a standby mode when no stress is to be detected, wherein said converting means comprises an operational amplifier having a first input terminal for receiving the drain output from said field-effect transistor, and a second input terminal, said control means comprising a switch having a movable contact connected to said second input terminal a first fixed terminal connected to ground, and a second fixed terminal connected to a voltage supply, whereby said gate-to-source voltage of the field-effect transistor can be varied when said movable contact is switched either from said first fixed terminal to said second fixed terminal or from said second fixed terminal to said first fixed terminal.

3. A semiconductor stress sensor comprising:

a field-effect transistor for producing a drain output commensurate with a stress applied thereto, biasing means for applying a gate bias voltage to said field-effect transistor, converting means for converting the drain output from said field-effect transistor into a detected output signal, and control means for varying a gate-to-source voltage of said field-effect transistor to reduce said drain output in a standby mode when no stress is to be detected, wherein said control means sets said gate-to-source voltage close to a threshold voltage of said field-effect transistor when in said standby mode.

4. A semiconductor stress sensor according to claim 3, wherein a drain-to-source voltage is maintained substantially constant when switching to and from said standby mode.

5. A semiconductor stress sensor according to claim 3, wherein a voltage supplied to the drain of said field-effect transistor is maintained in said standby mode.

6. A semiconductor stress sensor comprising:

a field-effect transistor for producing a drain output commensurate with a stress applied thereto, biasing means for applying a gate bias voltage to said field-effect transistor, converting means for converting the drain output from said field-effect transistor into a detected output signal, and control means for varying a gate-to-source voltage of said field-effect transistor to reduce said drain output in a standby mode when no stress is to be detected, wherein said control means varies said gate-to-source voltage only slightly when switching to and from said standby mode.

7. A semiconductor stress sensor comprising:

a field-effect transistor for producing a drain output commensurate with a stress applied thereto, biasing means for applying a gate bias voltage to said field-effect transistor, converting means for converting the drain output from said field-effect transistor into a detected output signal, and control means for varying a gate-to-source voltage of said field-effect transistor to reduce said drain output in a standby mode when no stress is to be detected, wherein said control means varies said gate-to-source voltage such that said field-effect transistor operates near a cut-off region when in said standby mode.

* * * * *